United States Patent [19]

Rausch

[11] Patent Number: 4,735,756

[45] Date of Patent: Apr. 5, 1988

[54] METHOD FOR PRODUCING LIGHT-WEIGHT MOLDED ARTICLES CONTAINING CERAMIC FIBERS

[75] Inventor: Miroslav Rausch, Bad Schwalbach, Fed. Rep. of Germany

[73] Assignee: Didier-Werke AG, Wiesbaden, Fed. Rep. of Germany

[21] Appl. No.: 777,771

[22] Filed: Sep. 19, 1985

[30] Foreign Application Priority Data

Oct. 6, 1984 [DE] Fed. Rep. of Germany ....... 3436781

[51] Int. Cl.$^4$ ................................................. B29B 1/26
[52] U.S. Cl. .......................................... 264/86; 264/87
[58] Field of Search ..................................... 264/86, 87

[56] References Cited

U.S. PATENT DOCUMENTS

| | | | |
|---|---|---|---|
| 3,976,728 | 8/1976 | Hawthorne | 264/87 |
| 4,401,613 | 8/1983 | Abell et al. | 264/86 |
| 4,421,599 | 12/1983 | Kuzuoka | 162/100 |
| 4,569,920 | 2/1986 | Smith-Johannsen | 264/86 |

FOREIGN PATENT DOCUMENTS

| | | | |
|---|---|---|---|
| 0077444 | 4/1983 | European Pat. Off. | |
| 52-10126 | 3/1977 | Japan | 264/86 |
| 60-149403 | 3/1985 | Japan | 264/87 |
| 804756 | 11/1958 | United Kingdom | 264/86 |
| 1283692 | 8/1972 | United Kingdom | |

*Primary Examiner*—James Derrington
*Attorney, Agent, or Firm*—Wenderoth, Lind & Ponack

[57] ABSTRACT

Method for the production of light-weight molded articles wherein, in a first embodiment, a dispersion of ceramic fibers is flocculated with a cationic flocculating agent, a dispersion of finely divided refractory material and inorganic bonding agent is flocculated with an anionic flocculating agent, the flocculated dispersions are mixed together, and following settling of the mixture and optional removal of excess liquid, the mixture is filled into molds, converted by dewatering into molded articles, and dried. According to a second embodiment, a dispersion of ceramic fibers is flocculated with a cationic flocculating agent, finely divided refractory material and inorganic bonding agent which may be stirred in with water are added to this flocculated dispersion, an aqueous solution of an anionic flocculating agent is mixed into this mixture, and following settling of the mixture and optional removal of excess liquid, the mixture is filled into molds, converted by dewatering into molded articles, and dried.

20 Claims, No Drawings

METHOD FOR PRODUCING LIGHT-WEIGHT MOLDED ARTICLES CONTAINING CERAMIC FIBERS

BACKGROUND OF THE INVENTION

The present invention relates to the production of light-weight molded articles from aqueous dispersions containing ceramic fibers, finely divided refractory materials and conventional additives.

Light-weight molded articles which contain a ceramic fiber component are used for purposes of insulation and as coatings which come into contact with molten metal, especially melts of aluminum and aluminum alloys.

For example, DE-AS 19 47 904 describes a refractory, heat-insulating material of aluminum silicate fibers and a bonding agent, which includes refractory filler materials in particle form. This known heat-insulating material is produced from an aqueous suspension with a consistency of 1% which is formed by dewatering the suspension in screen molds. The refractory material contains starch as bonding agent and a colloidal silicon dioxide sol.

European patent application No. 0 077 444 discloses a plate material containing a small portion of ceramic fibers, an organic bonding agent and colloidal silicon dioxide as inorganic bonding agent, as well as small quantities of a flocculating agent. This plate material contains more than 50% by weight of an inorganic fire-resistant filler material. In the production of such plates, a cationic polyacrylamide is used as a flocculating agent, which is added as a last component to the aqueous suspension of the other components.

A refractory insulation material and method for its production is also known from German Patent Application 1 646 449, which consists of 2 to 10% by weight aluminum-silicate fibers, very finely divided silicon dioxide and calcium aluminate bonding agents and 32 to 68% water, relative to the dry weight of the mixture.

SUMMARY OF THE INVENTION

An object of the present invention is an improved method for the production of light-weight molded articles which can be used especially as a replacement for asbestos in foundries, especially in foundries for aluminum or aluminum alloys.

Another object is to provide light-weight molded articles, such as light-weight refractory bricks, which contain only relatively small quantities of ceramic fibers, but gross densities of 0.5 g/cm³ in the dry or calcined state. The mechanical properties such as cold compressive strength and heat conductivity are to be sufficiently high, and the light-weight molded articles are to be produced at very low cost.

These objects are achieved, in accordance with a first embodiment of the invention, by a method wherein a dispersion of ceramic fibers is flocculated with a cationic flocculating agent, a dispersion of finely divided refractory material and inorganic bonding agent is flocculated with an anionic flocculating agent, the flocculated dispersions are mixed together, and following settling of the mixture it is filled into molds in a known manner, is converted by dewatering into a molded article, and the molded article is dried.

The objects of the present invention can also be achieved, in accordance with a second embodiment of the invention, by a method wherein a dispersion of ceramic fibers is flocculated with a cationic flocculating agent, finely divided refractory material and inorganic bonding agent are added to the flocculated dispersion, an anionic flocculating agent is mixed into this mixture, and following settling of the mixture it is filled into molds in a know manner, is converted by dewatering into a molded article, and the molded article is dried.

DETAILED DESCRIPTION OF THE INVENTION

More specifically, in accordance with the first embodiment of the invention, there is provided a method for producing a light-weight molded article, which comprises flocculating a first aqueous dispersion containing ceramic fibers with a cationic flocculating agent to produce a first flocculated dispersion; flocculating a second aqueous dispersion containing refractory material having a particle size of not more than 0.09 mm and an inorganic bonding agent with an anionic flocculating agent to produce a second flocculated dispersion; mixing said first and second flocculated dispersions with each other to produce a mixture of said dispersions; allowing said mixture to settle; introducing the settled mixture into a mold; removing excess water from the mixture in said mold to form a molded article; and further drying said molded article.

In accordance with the second embodiment of the invention, the method for producing a light-weight molded article comprises flocculating an aqueous diespersion containing ceramic fibers with a cationic flocculating agent to produce a flocculated dispersion; adding refractory material having a particle size of not more than 0.09 mm and an inorganic bonding agent to said flocculated dispersion to produce a first mixture; adding an anionic flocculating agent to said first mixture to produce a second mixture; allowing said second mixture to settle; introducing the settled mixture into a mold; removing excess water from the mixture in the mold to form a molded article; and further drying said molded article.

The following discussion will apply to both the first and second embodiments of the invention, unless otherwise stated.

Some of the excess liquid may be removed from the settled mixture before introducing the mixture into the mold.

In addition to drying the molded article, it may thereafter be calcined.

Preferably, the light-weight molded article contains 2-25% by weight, more preferably 5-17% by weight, of the ceramic fibers and 75-98% by weight, more preferably 83-95% by weight, of the refractory material based on the combined weight of the ceramic fibers and refractory material.

According to a preferred aspect of the invention, the portion of ceramic fibers is 2-10% by weight and the portion of refractory material is 90-98% by weight based on the combined weight of the ceramic fibers and refractory material, for the production of light-weight molded articles with a gross density of $\geq 1$ g/cm³ and a cold compressive strength of $>4$ N/mm². Portions of 5-10% by weight ceramic fibers and 90-95% by weight refractory material are particularly suitable in this regard.

According to the another preferred aspect, the mold used for dewatering is filled 1-10 cm deep with a solution of an anionic flocculating agent before filling the mixture into the mold. A uniform settling of the aqueous dispersion during the dewatering is thus attained, so that no outside skin is formed on the light-weight molded articles of another composition than that of the inside of the molded articles.

In another preferred aspect, especially in order to attain a lower gross density of the finished light-weight molded article, a dispersion of the ceramic fibers with a consistency of less than 0.3% by weight, more preferably 0.08–0.2% by weight of the fibers, is used in forming the aqueous dispersion of fibers.

In the first embodiment of the invention, the second aqueous dispersion further contains 0.5–3.5% by weight of ceramic or organic fibers based on the weight of the refractory material. These fibers are present in the second aqueous dispersion before the dispersion is flocculated.

In the second embodiment of the invention, the refractory material and inorganic bonding agent can be mixed with water before adding them to the flocculated dispersion.

Any of the known refractory ceramic fibers can be used as the ceramic fibers in the invention, and these conventionally have an $Al_2O_3$ content greater than 45% by weight. Such fibers may also be aluminum silicate fibers. However, quartz fibers can also be used as ceramic fibers, i.e. fibers of $SiO_2$, and furthermore aluminum oxide fibers, i.e. fibers with a content of at least 95% by weight $Al_2O_3$, can be used.

The finely divided refractory materials used in the production of the light-weight molded articles according to the invention, with a grain size $\leq 0.09$ mm, can, if desired, be a dross. Conventional refractory materials can be used, e.g. fireclay, bauxite, aluminum oxide, corundum, zirconium dioxide, zirconium silicate, magnesium oxide, cordierite, carbon or graphite, coke and silicon carbide.

Any known cationic polyelectroylte, e.g. methacrylic acid ester (trade name Rohafloc KF975), is used as the cationic flocculating agent. Such polyelectroyltes are conventionally used in a quantity of 5 g per 100 kg of dispersion. These cationic flocculating agents are conventionally in the form of a solution with a concentration of 0.5–1% by weight. Preferably 1% by weight solutions are formed originally and then are further diluted before use to a 0.05–1% by weight solution.

Any known anionic polyelectrolyte, e.g. based on acrylamides, can be used as anionic flocculating agent. The conventional amount is 15 g per 100 kg of dispersion. These anionic flocculating agents are likewise in solution form, conventionally with a concentration of 0.25–0.5% by weight. They are preferably formed originally as 0.5% by weight solutions and further diluted before use to a 0.05–0.1% by weight solution.

With use of a cationic flocculating agent, such as a methacrylic acid ester, and an anionic flocculation agent, for instance an anionic polyelectrolyte based on acrylamide, the ratio is advantageously 1 : 3 for cationic flocculating agent : anionic flocculating agent.

The bonding agent which may be added in the production of light-weight xolded articles according to the invention can be any conventional known bonding agent such as, e.g. clay or a phosphate bonding agent.

In the first embodiment of the invention, as a result of the separate production of the two dispersions, one the ceramic fibers and the other the finely divided refractory materials, with the separate flocculation of these dispersion with different flocculating agents and the mixing of the flocculated dispersions occurring only thereafter, it is possible to attain very low gross densities of the dried light-weight molded articles in which, however, good mechanical properties, such as relatively high levels of cold compression strength and retention of heat conductivity of the finished light-weight molded articles, are retained.

The same is true for the second embodiment of the invention, in which the anionic flocculating agent, preferably in solution form, is mixed into the mixture of a flocculated dispersion of the ceramic fibers and the added, finely divided refractory materials.

Following the mixing of the two flocculated dispersions in the first embodiment, or the addition of the anionic flocculating agent in the second embodiment, the mixture which is obtained can be left to settle for some time, so that excess liquid, which is essentially water, can be removed. This excess liquid can then be used again for new dispersions of the refractory material and/or the ceramic fibers, so that the total volume of water used in the method of the invention can be very low despite the optional low consistency of the dispersions.

The molded articles are produced in a known manner with the use of screen molds, and the dewatering can be further supported by application of a vaccum. Following dewatering of the molded articles in the mold, the articles are dried, usually at a temperature of 110°–180° C., and then they may be calcined, if desired. The light-weight molded articles however can also be used directly following the drying, i.e. following removal of the physically bound water.

The respective dispersions of refractory material and ceramic fibers can be produced in suitable containers and mixed by means of a mixer which thoroughly mixes the two dispersions together. This thorough mixing can be in batches, or can occur with the use of suitable control devices allowing continuous mixing of the two dispersions in the desired volume ratios, and continuous operation is thus possible.

In either of the first and second embodiments of the method according to the invention it is possible, with production of the original dispersions, to continuously carry out the flocculation of the two dispersions (first embodiment) or the flocculation of the single dispersion and the addition of the finely divided refractory material (second embodiment).

In the invention, light-weight molded articles can be produced in the form of plates, blocks, tubes and so forth in a manner known in the production of such molded articles from aqueous dispersions, i.e. conventionally with use of suitable screen devices and devices for the suction removal of the water, e.g. vacuum boxes.

The first embodiment of the invention must be carried out in two containers, since the dispersions of ceramic fibers and finely divided refractory materials must be separately produced. This embodiment of the invention is especially suitable for the production of light-weight molded articles with a gross density $\leq 1$ g/cm$^3$.

In the second embodiment of the invention, only one container is required for production of the mixture, which provides a cost savings relative to the treatment plant required. This embodiment is especially advantageous for production of light-weight molded articles with a gross density $\geq 1$ g/cm$^3$.

The invention will be explained hereinafter in more detail with reference to the following examples, which do not limit the invention.

EXAMPLE 1

9 kg of ceramic fibers with an $Al_2O_3$ content of 47% by weight were dispersed in 4500 liters of water. This dispersion was flocculated with a commercial cationic flocculating agent (trade name Rohafloc KF975), approximately 6 liters of which was added in the form of a 0.1% solution. This dispersion was mixed thoroughly in a 6 $m^3$ container and left to settle. During settling, approximately 70% of the excess, clear water was drained off.

64 kg of finely divided bauxite, 25 kg clay and 1 kg of ceramic fibers were dispersed in a second 6 $m^3$ container in 1300 kg of water by means of a propeller stirrer. An anionic flocculation agent (trade name Rohafloc SF170) was added to this suspension in the form of a 0.1% by weight solution in water in a quantity of approximately 18 liters. This suspension was likewise left to settle, and then 60% of the excess, clear liquid was drained-off.

Both dispersions were mixed together, after letting them flow simultaneously into a 6 $m^3$ container. After being left to settle, approximately 70% of the excess, clear liquid was drawn off. All of the drawn off liquids, which were practically pure water, could be used for preparing new dispersions.

The remaining mixture was then filled into a suitable mold provided with a screen floor for the production of plates. Plates of 2-5 cm in thickness were produced by dewatering with application of a vacuum. Following drying at 150° C. for 8 hours, the plates had a gross density of 0.8 g/$cm^3$.

EXAMPLE 2

The method for the production of the dispersion of ceramic fibers of Example 1 was repeated. 25 kg of clay and 64 kg finely divided bauxite with a grain size of 0.09 mm were added to the dispersion which was produced. The mixture which was obtained was thoroughly mixed and stirred, and a 0.1% by weight solution of the anionic flocculating agent used in Example 1 was stirred into the mixture.

The mixture was then left to settle and was further treated to form plates as in Example 1.

The plates which were obtained had a gross density of 1.1 g/$cm^3$.

EXAMPLE 3

The method of Example 1 was repeated, but this time ceramic fibers were used with a high aluminum oxide content of approximately 95% $Al_2O_3$.

The plates which were obtained had a gross density of 0.9 g/$cm^3$.

EXAMPLE 4

The method of Example 1 was repeated, but this time 2 kg of sisal fibers instead of 1 kg of ceramic fibers were added in the production of the dispersion of bauxite.

Light-weight molded bricks were obtained which had a gross density of 0.75 g/$cm^3$.

EXAMPLE 5

The method of Example 2 was repeated, but this time in the production of the second dispersion, a hydraulic binding material was added instead of the clay, and aluminum oxide was added instead of the bauxite.

The light-weight molded plates which were obtained had a gross density of 1 g/$cm^3$.

I claim:

1. A method for producing a light-weight molded article, which comprises:
   flocculating a first aqueous dispersion containing ceramic fibers with a cationic flocculating agent to produce a first flocculated dispersion,
   flocculating a second aqueous dispersion containing refractory material having a particle size of not more than 0.09 mm and an inorganic bonding agent with an anionic flocculating agent to produce a second flocculated dispersion,
   mixing said first and second flocculated dispersions with each other to produce a mixture of said dispersions,
   allowing said mixture to settle,
   introducing the settled mixture into a screen mold,
   removing excess water from the mixture in said screen mold to form a molded article, and
   further drying said molded article.

2. The method according to claim 1, wherein said refractory material is a dross.

3. The method according to claim 1, which further comprises removing some of the excess liquid from said settled mixture before introducing said mixture into said screen mold.

4. The method according to claim 1, which further comprises calcining said dried molded article.

5. The method according to claim 1, wherein said light-weight molded article contains 2-25% by weight of said ceramic fibers and 75-98% by weight of said refractory material based on the combined weight of said ceramic fibers and refractory material.

6. The method according to claim 5, wherein the amount of said ceramic fibers is 5-17% by weight and the amount of said refractory material is 83-95% by weight.

7. The method according the claim 1, which further comprises introducing an aqueous solution of said anionic flocculating agent into said screeen mold to the extent of 1 - 10 cm deep before introducing said mixture into said screen mold, 8. The method according to claim 1, wherein said first aqueous dispersion contains less than 0.3% by weight of said ceramic fibers based on the weight of said first aqueous dispersion.

9. The method according to claim 8, wherein the amount of said ceramic fibers is 0.08-0.2% by weight.

10. The method according to claim 1, wherein said second aqueous dispersion further contains 0.5-3.5% by weight of ceramic or organic fibers based on the weight of said refractory material.

11. A method for producing a light-weight molded article, which comprises:
    flocculating an aqueous dispersion containing ceramic fibers with a cationic flocculating agent to produce a flocculated dispersion,
    adding refractory material having a particle size of not more than 0.09 mm and an inorganic bonding agent to said flocculated dispersion to produce a first mixture,
    adding an anionic flocculating agent to said first mixture to produce a second mixture,
    allowing said second mixture to settle,
    introducing the settled mixture into a screen mold,
    removing excess water from the mixture in said screen mold to form a molded article, and further drying said molded article.

12. The method according to claim 11, wherein said refractory material is a dross.

13. The method according to claim 11, which further comprises removing some of the excess liquid from said settled mixture before introducing said mixture into said screen mold.

14. The method according to claim 11, which further comprises calcining said dried molded article.

15. The method according to claim 11, wherein said light-weight molded article contains 2-25% by weight of said ceramic fibers and 75-98% by weight of said refractory material based on the combined weight of said ceramic fibers and refractory material.

16. The method according to claim 15, wherein the amount of said ceramic fibers is 5-17% by weight and the amount of said refractory material is 83-95% by weight.

17. The method according to claim 11, which further comprises introducing an aqueous solution of said anionic flocculating agent into said screen mold to the extent of 1-10 cm deep before introducing said mixture into said screen mold.

18. The method according to claim 11, wherein said aqueous dispersion contains less than 0.3% by weight of said ceramic fibers based on the weight of said aqueous dispersion.

19. The method according to claim 18, wherein the amount of said ceramic fibers is 0.08-0.2% by weight.

20. The method according to claim 11, which further comprises mixing said refractory material and inorganic bonding agent with water before adding said refractory material and bonding agent to said flocculated dispersion.

* * * * *